United States Patent [19]

Manea et al.

[11] Patent Number: 5,341,917

[45] Date of Patent: Aug. 30, 1994

[54] TIMED RETENTION CONVEYING APPARATUS

[76] Inventors: Ion Manea, 13407-48th Ave. S., Tukwila, Wash. 98168; Dallas D. Hanes, 6535 S. Admiralty Way, Freeland, Wash. 98249

[21] Appl. No.: 962,675

[22] Filed: Oct. 19, 1992

[51] Int. Cl.[5] ............................................. B65G 29/00
[52] U.S. Cl. ................................... 198/475.1; 198/798
[58] Field of Search ................. 198/475.1, 798, 797, 198/799, 800

[56] References Cited

U.S. PATENT DOCUMENTS

| | | | |
|---|---|---|---|
| 1,905,924 | 4/1933 | MacLaughlan | 198/798 X |
| 2,390,455 | 12/1945 | Nalbach | 198/798 |
| 2,414,164 | 1/1947 | Nalbach | 198/798 |
| 2,493,857 | 1/1950 | Cargill | 198/798 |
| 2,555,838 | 6/1951 | Abbott | 198/798 |
| 2,893,538 | 7/1959 | Buttironi et al. | 198/798 X |
| 3,202,115 | 8/1965 | Jones, Jr. | 198/798 X |
| 3,243,032 | 3/1966 | Chambon | 198/798 X |
| 5,214,999 | 6/1993 | Norrie et al. | 198/475.1 X |

*Primary Examiner*—D. Glenn Dayoan

[57] ABSTRACT

An apparatus, using rigid surfaces or trays, to convey indexed items through a controlled environment when the items require a specific retention time within the controlled environment and to attain the desired retention time by traversing back and forth within the controlled environment as many times as necessary, within the constraints set by the height of the controlled environment, to achieve said retention time. The apparatus includes mechanisms for lifting or lowering trays from one level to another, at the end of each traverse, through a plurality of levels, which maintain the trays in a horizontal orientation while being lifted or lowered and to accomplish this as a smooth, continuous, and reversible process, unaffected by the heat or cold of the controlled environment.

5 Claims, 10 Drawing Sheets

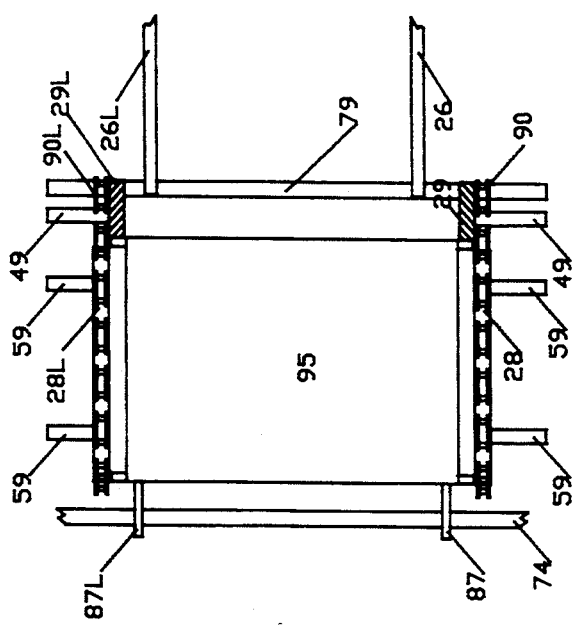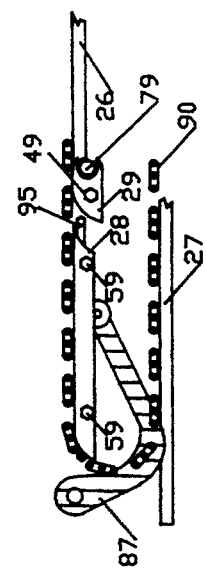

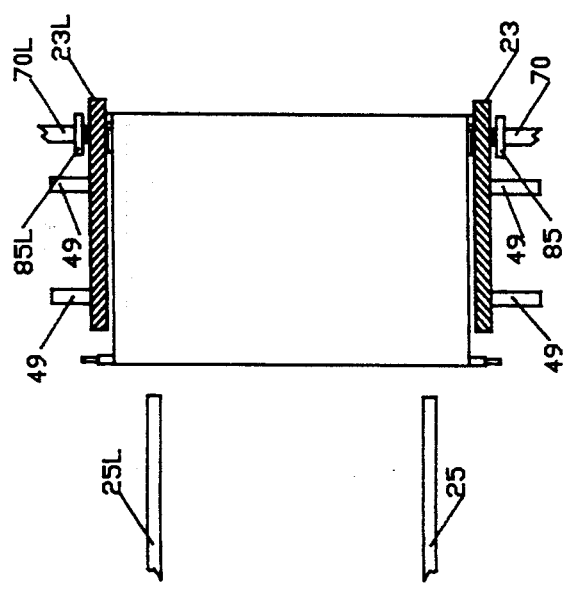
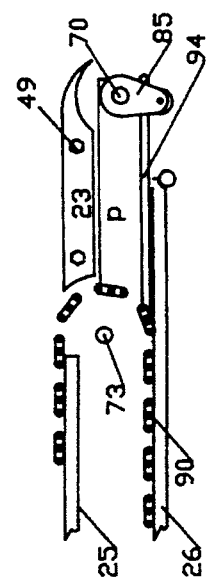
Fig. 7a
Fig. 7b

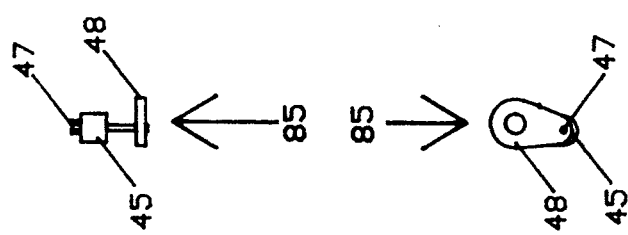
Fig. 9c
Fig. 9d
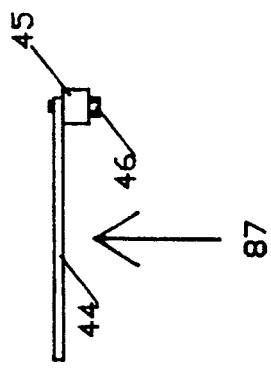
Fig. 9a
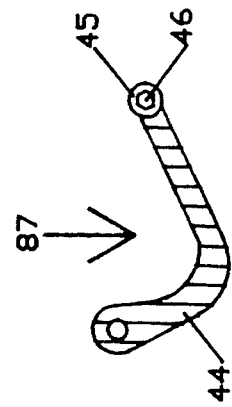
Fig. 9b

TIMED RETENTION CONVEYING APPARATUS

BACKGROUND—FIELD OF INVENTION

This invention relates generally to a machine for moving quantities of product or items, into, through and out of a controlled environment in a continuous process. The length of the process or retention time within the controlled environment, to be determined in part by the length of the conveyor and the length of the conveyor is determined by, the size and how often it traverses, the controlled environment. A partial list of these environments might include: A freezer for food processing, a low temperature oven for bread proofing, a medium temperature oven for bread baking or a high temperature oven for annealing or heat treating.

BACKGROUND—DESCRIPTION OF PRIOR ART

Heretofore, two types of continuous conveyors have been in use, which are capable of traversing more than one level without reversing the loaded surface (i.e., turning the surface upside down). The first type uses trays, spaced between and separating two chains. The chains, after traversing several levels, return to their starting point and attach to themselves to make the conveyor continuous.

Each tray is attached to the chains at only on end, which allows the other end of the tray to pivot or hinge and thereby allows the trays to maintain their relative attitude as they follow the chain to the next level. A pin projecting from the side of each tray at its free end is intended to engage with an idler sprocket which partially lowers the tray to the next level. A system of fixed rails and shoes also help guide the pins and assist the tray in making the transition from one level to the next.

Because of the clearance needed, between the pins and shoes to avoid binding and to insure the tray pin will engage between the teeth of the idler sprocket, the free end of the tray is dropped and tilted several degrees before it completes a full transition. This dropping and tilting prohibits this type from being used for conveying open containers of liquid. Also this type will not operate in reverse which puts constraints on its applications and creates an additional problem if there is a jam, since it is difficult or impossible to back up to release the jam.

This type is susceptible to clearance changes caused by heat, is likely to jam from ice build up, and is also susceptible to stretch in the drive chain, which is used for timing. When this happens, the pins no longer match their grab point on the idler sprocket, causing the pins to be sheared off, and the unsupported tray to jam and stop the machine.

The second type employs a wire mesh chain link belt which is constructed to allow lateral turns. The belt can be made to spiral up or down through a controlled environment but these lateral turns or spirals are communicated to the conveyed items causing them shift or squirm on the belt surface, making these items almost impossible to index and be picked up by an automatic unloading device.

Because of the nature of the belt, the diameter of these spirals are quite large in relation to the belt width, which means it will only fit in a large square area and does not adapt well to long narrow rooms or other irregular shaped spaces.

This invention eliminates these problems.

SUMMARY OF THE INVENTION

This invention relates to an apparatus for moving quantities of product, into, through and out of a controlled environment as a continuous process. This device is completely reversible and smooth in operation with no spilling, dropping or bumping of the conveyed products. The process or retention time, is governed in part by a variable speed controlled motor and in part by the conveyor length and the conveyor length to be governed by the number of traversing levels, within the controlled environment, thereby lengthening the time the product is held within the controlled environment.

It is one object of the invention to provide devices which allow rigid surfaces or trays on a continuous, chain driven conveyor, to be lifted or lowered through multiple levels.

It is one object of the invention to provide a more dependable apparatus for continuously processing quantities of items requiring retention times, in a controlled environment, ranging from less than one hour to many hours.

It is one object of the invention to provide a tray conveyor system which is reversible and able to be loaded at either end.

It is one object of the invention to provide a mechanism to maintain the rigid surfaces or trays in a horizontal orientation.

It is one object of the invention to provide a smooth positive mechanism which will not disturb or spill open containers before leaving the environmental enclosure.

It is one object of the invention to provide a system of lifting devices which will operate in refrigerated environments.

It is one object of the invention to provide a system of lifting devices which will operate in heated environments.

It is one object to provide a system of lifting devices less dependent on drive chain age or condition.

It is one object of the invention to avoid chain stretch by driving each additional set of levels independently.

Further objects and advantages of this invention will become apparent from a consideration of the ensuing description and drawings.

BRIEF DESCRIPTION OF THE DRAWINGS

In the drawings, closely related figures may have the same number but a different alphabetic suffix, in particular, the letter L which denotes a similar part but on the far or off side.

FIGS. 6a and 6b are detailed views showing an embodiment of a typical tray and cam lifting arm.

FIGS. 7a and 7b are detailed views showing an embodiment of a typical tray and gear lifting arm.

FIGS. 9a-d are detailed views showing an embodiment of a typical cam lifting arm and a typical gear lifting arm.

Description—Structure or Framework

Figure 2:
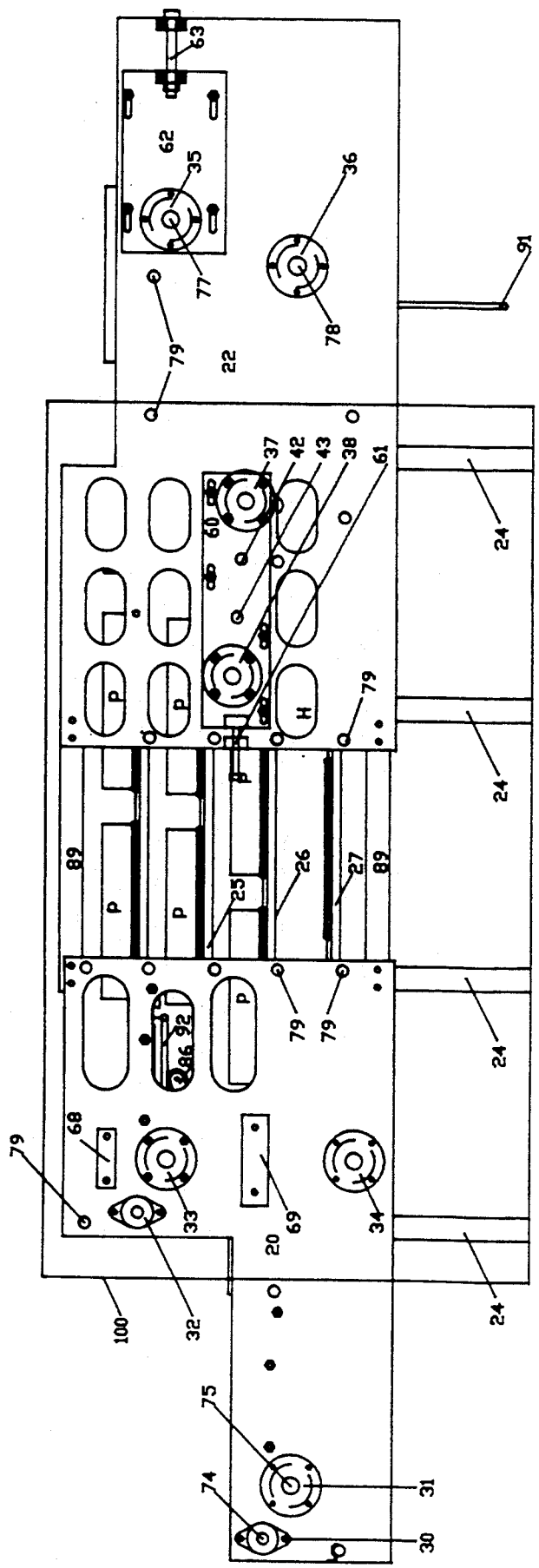
FIG. 2 is an elevation view showing an embodiment of the timed retention conveying apparatus with drive and gearing mechanism removed exposing bearing and shaft placement.
Figure 3:
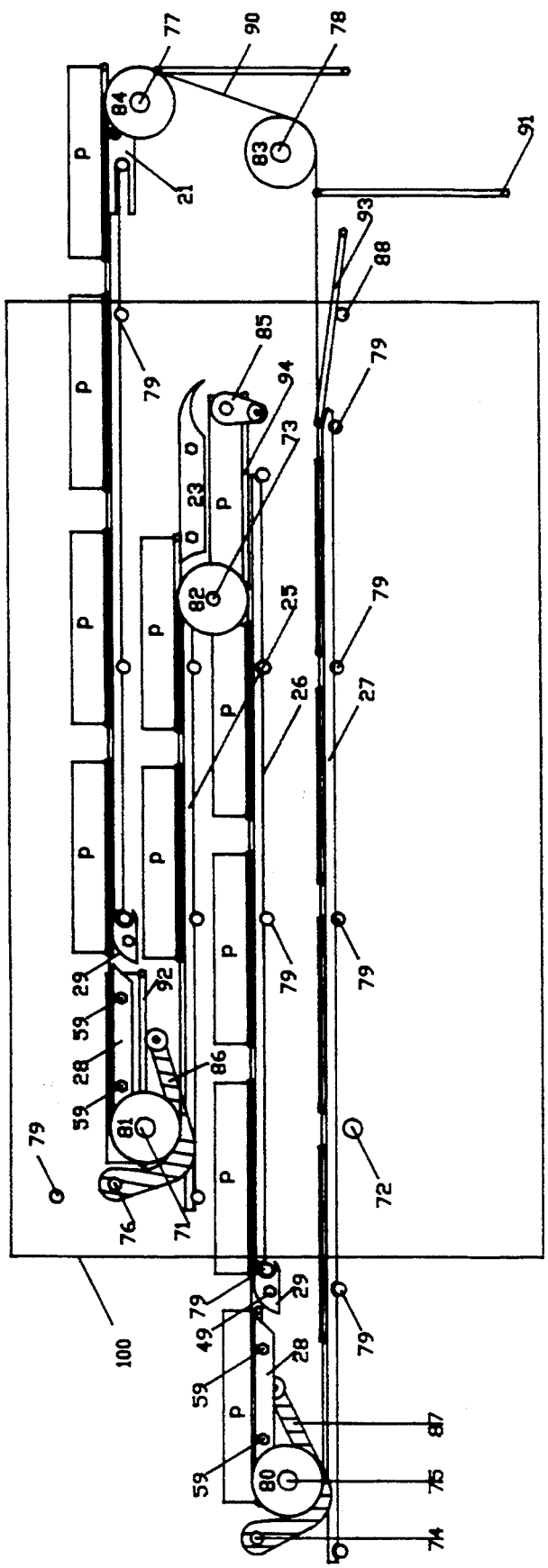
FIG. 3 is an elevation view showing an embodiment of the timed retention conveying apparatus with drive mechanism and side plates removed to expose chain, sprockets, lifting devices and trays.
Figure 5:
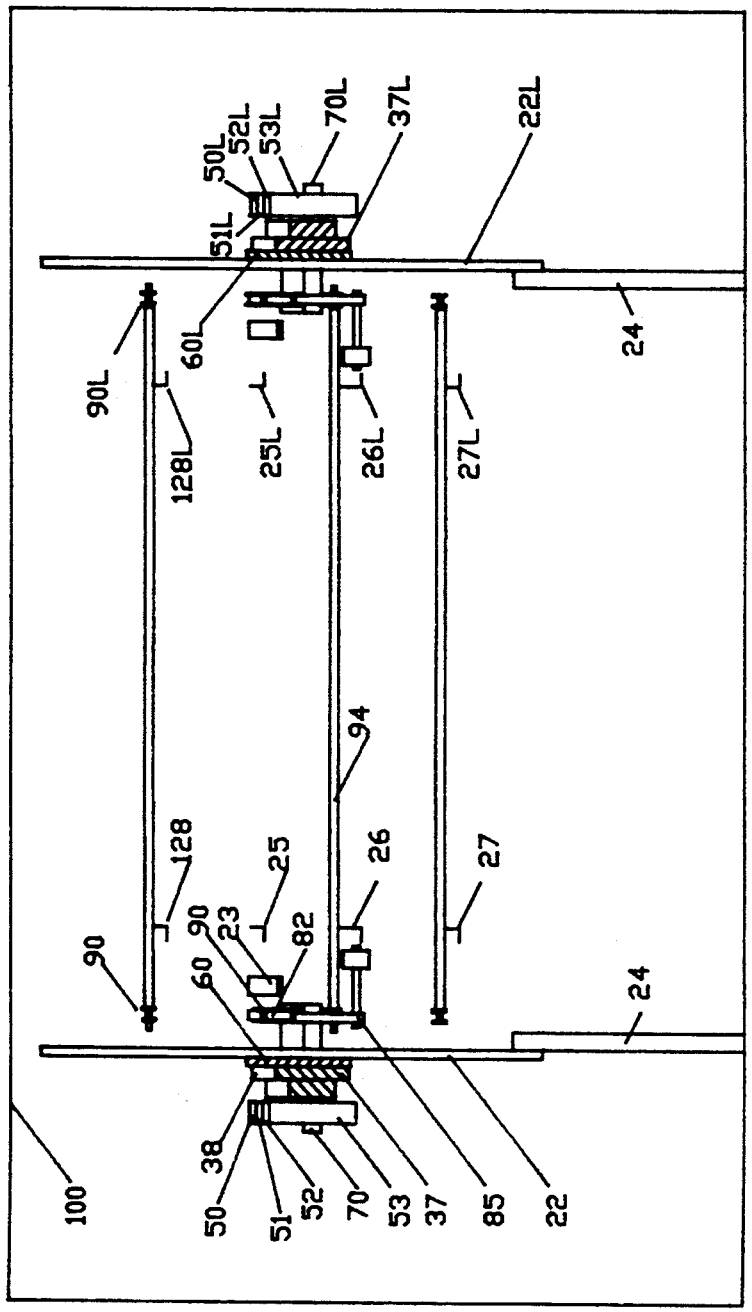
FIG. 5 is a view of the portion indicated by the section lines 5—5 in FIG. 1.

A typical embodiment of the frame and supporting structure of the present invention is illustrated in FIG. 2, an elevation view showing side plates 20 and 22, supported by machine supports 24 and held in relation to each other by side plate tie members 89. FIG. 5, a section view, illustrates side plate 22L, on the off side, held and supported in a like manner. FIG. 5 also illustrates how main cross supports 79 maintain side plates 20 and 20L and side plates 22 and 22L in correct position. FIGS. 3 & 5 illustrate how main cross supports position and support left and right tray support rails 25 and 25L, 26 and 26L, 27 and 27L, and 128 and 128L.

Operation—Structure

Tray support rails, such as 25 and 25L, to be fabricated from or covered or coated with a bearing material to promote a friction reduced surface for sliding trays. Tray guides 21, 23, 23L, 28, 28L, 29 and 29L and roller 45, in FIG. 9, to be fabricated from or covered by a friction reducing material compatible with the temperatures expected within the environmental enclosure. Side plates 20 and 20L, and 22 and 22L act as a boxed structure for the mounting of all bearings, shafts and idler plates.

Description—Drive Mechanism

Figure 1:
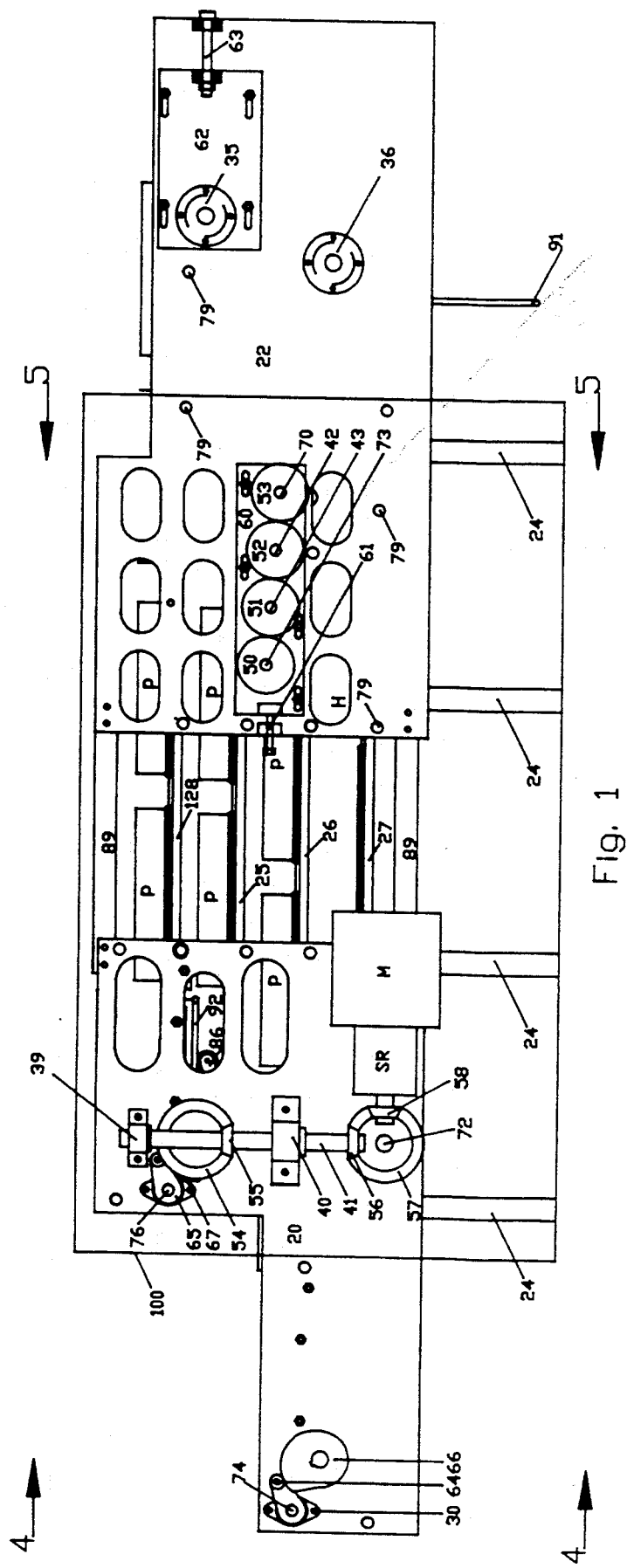
FIG. 1 is an elevation view showing an embodiment of the timed retention conveying apparatus with drive and gearing mechanism in place.
Figure 4:
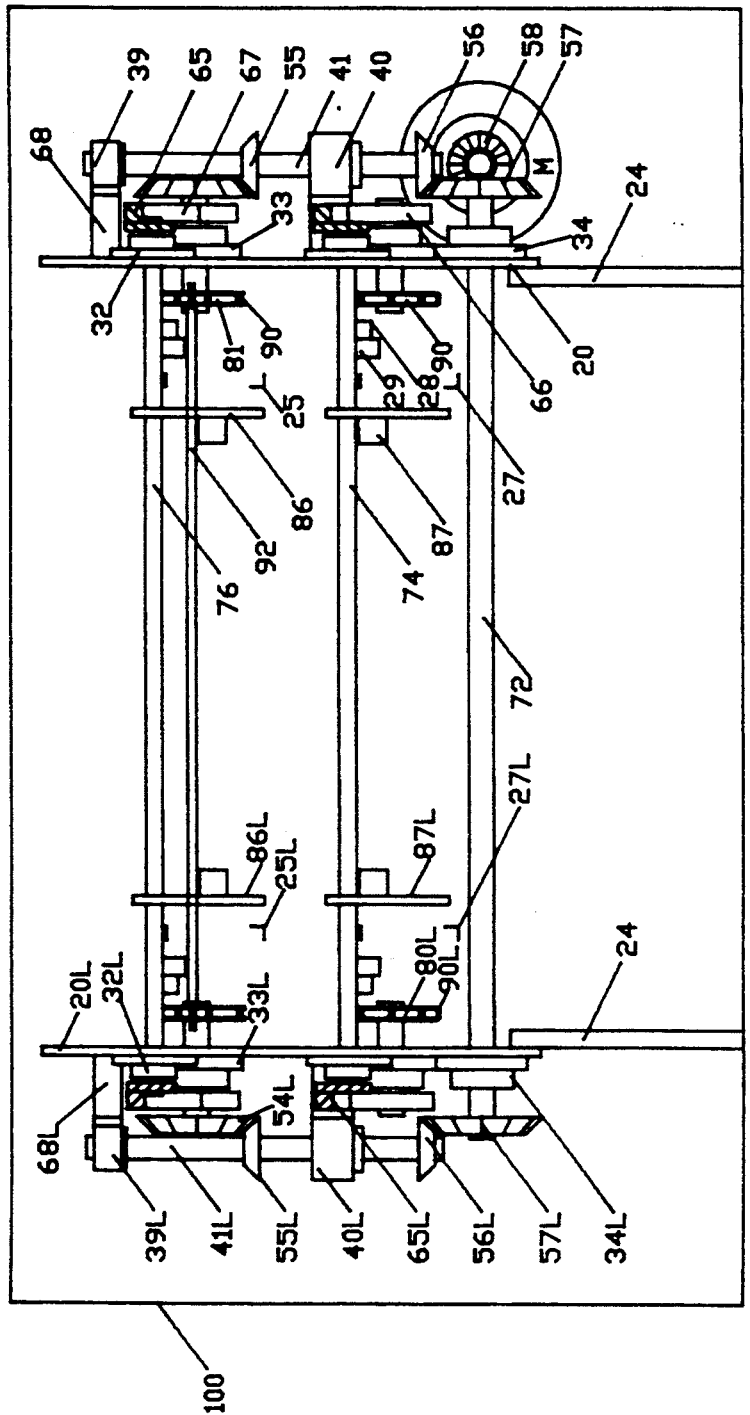
FIG. 4 is a view of the portion indicated by the section lines 4—4 in FIG. 1.

A typical embodiment of the drive mechanism of the present invention is illustrated in FIG. 1, an elevation view and FIG. 4, a detail view of the drive end, in which an electric motor M and a speed reducer SR, attached to side plate 20 and supported by machine supports 24, communicates a rotational movement through bevel gear 58 and bevel gear 57 to cross shaft 72, supported by bearing 34 on side plate 20 and bearing 34L on side plate 20L, and through bevel gear 56 to vertical shaft 41. Vertical shaft 41 is supported by bearing 39 mounted on foundation 68 and bearing 40 mounted on foundation 69. Foundation 68 and 69 are fastened to side plate 20. Vertical shaft 41 communicates its rotational movement through attached bevel gear 55 to gear 54. Bevel gear 54 transmits rotational movement through attached shaft 71 to attached sprocket 81. Sprocket 81 communicates this rotational movement to chain 90, causing trays 91, 92, 93, 94, etc. to move in a lineal manner.

Cross shaft 72 also communicates its rotational movement through bevel gears 57L and 56L to vertical shaft 41L on left or off side of machine mechanism. Vertical shaft 41L is supported by bearing 39L mounted on foundation 68L and bearing 40L mounted on foundation 69L. Foundation 68L and 69L are fastened to side plate 20L. Vertical shaft 41L communicates its rotational movement through attached bevel gear 55L to gear 54L. Bevel gear 54L transmits rotational movement through attached shaft 71L to attached sprocket 81L. Sprocket 81L communicates this rotational movement to chain 90L, also causing trays 91, 92, 93, 94, etc. to move in a lineal manner.

Operation—Drive Mechanism

The variable speed motor and speed reducer, drive both sides through cross shaft 72 and then vertical shafts 41 and 41L which then communicate their rotational energy through bevel gears to shafts 71 and 71L and sprockets 81 and 81L. The cross shaft 72 then assures both chain 90 and chain 90L will be driven together and receive an equal amount of energy and both will be kept in time. This drive arrangement also allows for levels, above and in addition to the ones illustrated, to be driven in the same manner by lengthening shafts 41 and 41L and adding bevel gears similar to 54 and 55. This system reduces lurching caused by starting stretch and torsion delays, most notable in systems over one hundred feet long.

Description—Cam Lifting Mechanism

Referring to FIG. 1, elevation view with drive mechanism in place, FIG. 2, elevation view showing shaft and bearing placement, FIG. 3, elevation view with drive mechanism and side plates removed, FIG. 4, section view of drive end, and FIG. 6, detail, a detailed embodiment of the invention is shown in which sprocket 81, joined to shaft 71, and supported by bearing 33, communicates movement to trays 91, 92, 93, etc., through chain 90 and rotates cam 67, also joined to shaft 71. As cam 67 rotates, cam follower 65 rotatively communicates motion to cam lifting arm shaft 76, supported by cam follower bearing 32, raising and lowering cam lifting arm assembly 87 and raising or lowering free end of tray 92, to the next level. A detail of cam lifting arm assembly 87 is illustrated in FIG. 9. Cam lifting arm assemblies, such as 87 and 87L, have rollers 45, to communicate with and to facilitate movement of the trays such as tray 95 in FIG. 6.

Each cam has one lobe per rotation. The tray chain pins 97, are inserted in the pierced holes of the chains 90 and 90L. All sprockets have the same number of teeth and that number is equal to the number of chain links between tray chain pin 97 of one tray and tray chain pin 97 of the preceding tray, and this relationship of chain links to sprocket teeth is to be maintained throughout the entire length of the conveyor and the number of chain links between trays to remain consistent.

Figure 8A:
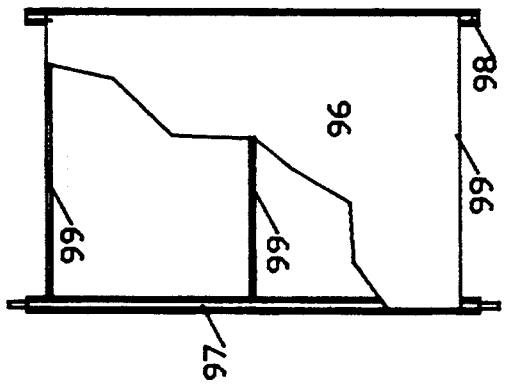
FIGS. 8a-8b are detailed views showing an embodiment of a typical tray.
Figure 8B:
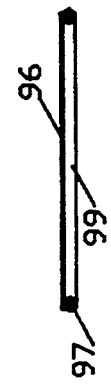

As illustrated in FIG. 8 an embodiment of a typical tray assembly such as tray 91 or 92, the tray assembly has four major components, the tray chain pin 97, the tray guide pin 98, the flat bar stiffeners 99 and the cover 96. The flat bar stiffeners 99 are fastened to the tray chain pin 97 and the tray guide pin 98, to act as frame for and offer rigidity to tray cover 96. Tray cover 96 is also fastened to tray chain pin 97, tray guide pin 98 and stiffeners 99. Tray chain pin 97 extends beyond tray cover 96 enough to reach the hinge attachment point of chain 90 on one side and chain 90L on the other side. In this embodiment, both ends of tray chain pin have been turned to match freely the pierced holes in chains 90 and 90L. This then becomes the hinged attachment point of the tray assembly. The tray guide pin 98 also extends beyond tray cover 96 on both sides but short of chains 90 and 90L, to avoid interference with chains 90 and 90L and to accommodate its own set of tray guides, such as guide 29 in FIG. 6 and guide 23 in FIG. 7.

Operation—Cam Lifting Mechanism

With sprocket 81 locked together with cam 67 on shaft 71, lifting arm assemblies 86 and 86L, locked to cam follower 65, will always raise and lower at the same point on each tray as that tray passes. As the hinged attachment point of tray 92 begins to raise, following chain 90 as it makes the turn around sprocket 81, the free end of tray 92 is picked up by lifting arm assemblies 86 and 86L. Lifting arm assemblies 86 and 86L are shaped to avoid interference with the hinged attachment point of tray 92. Lifting arm assemblies 86 and 86L are identical to lifting arm assembly 87 which is illustrated in FIG. 9 detail. Tray 92 is initially positioned by tray guide pins 98, projecting from free end of trays, and communicating with and between stationary guides 28 and 29, on near side and between stationary guides 28L and 29L on the far or off side, as lifting arm assemblies 86 and 86L drop away and until tray 92 reaches tray support rails 128 and 128L. Tray 92 will then slide along stationary guides 128 and 128L until coming to the next transition point. The operation of cam lifting arm assemblies 87 and 87L at sprocket 80 are identical to that just described for lifting arm assemblies 86 and 86L.

Description—Gear Lifting Mechanism

Referring to FIG. 1, elevation view showing drive, FIG. 2, elevation view showing bearing and shaft placement, FIG. 3, elevation view with side plates 20 and 22 removed and FIG. 5, section view, FIG. 9, detail, an embodiment of the invention is shown in which chain 90 moves tray 94 and communicates rotating movement to sprocket 82, locked on shaft 73, which rotates gear 50, also locked on shaft 73. Shaft 73 is supported by bearing 38 which is fastened to gear idler plate 60. Gear 50 transmits rotation to gear 53 through idler gears 51 and 52. Gear 53, locked to shaft 70, transmits rotation to lifting arm assembly 85, also locked to shaft 70. All gears are the same size. Two idler gears, 51 and 52, are used to transmit and change direction of rotation of the final gear 53.

Chain 90L moves with chain 90 and communicates rotating movement to sprocket 82L, locked on shaft 73L, which rotates gear 50L, also locked on shaft 73L. Shaft 73 is supported by bearing 38 which is fastened to gear idler plate 60. Gear 50L transmits rotation to gear 53L through idler gears 51L and 52L. Gear 53L, locked to shaft 70L, transmits rotation to lifting arm assembly 85L, also locked to shaft 70L. All gears are the same size. Two idler gears, 51L and 52L, are used to transmit and change direction of rotation of the final gear 53L. Lifting arm assembly 85 has roller 45 to facilitate movement of and communication with tray assemblies such as 94.

Operation—Gear Lifting Mechanism

Since all gears are the same size and all sprockets are the same size, then sprocket 82 and 82L will make one revolution between the passing of each tray and gears 53 and 53L will also make one revolution in the same amount of time but in the opposite direction. Gear lifting arm assemblies 85 and 85L, locked to gears 53 and 53L, will also rotate in the opposite direction of the sprockets 82 and 82L. This reverse rotation will facilitate the gear lifting arm assemblies 85 and 85L to remain under and support tray 94. The rotation of gear lifting arm assemblies 85 and 85L are timed to raise or lower trays, in this case tray 94 to the next level. Tray 94 is initially positioned by tray guide pins 98, communicating with idler tray guides 23 and 23L, to support tray guide pin 98 as lifting arm assemblies 85 and 85L are rotated away, until tray 94 is again supported by tray support rails 25 and 25L. Tray 94 will then slide along tray support rails 25 and 25L until coming to the next transition point. Chain 90 tension adjustment is accomplished by moving washer idler plates 60 and 60L with adjusting bolts 61.

Description—Washer and Return Mechanism

Referring to FIG. 2, elevation and FIG. 3, elevation, Sprocket 84 is rotated by communication with chain 90. Sprocket 84 fastened to shaft 77 is supported by bearing 35. Bearing 35 is fastened to washer idler plate 62. Washer idler plate 62 is fastened, to end plate 22 and adjusted by adjusting bolt 63.

Operation—Washer and Return Mechanism

Referring to FIG. 3, side view, a detail of the invention is shown in which trays moved by chain 90, are allowed to assume a vertical position after passing sprocket 84. This vertical position to be maintained for cleaning and drying or as part of the unloading process, until trays pass sprocket 82, at which time tray 93 is pulled into a horizontal position for return. Additional Chain 90 tension adjustment is accomplished by moving washer idler plate 62 with adjusting bolt 63.

Figure 10:
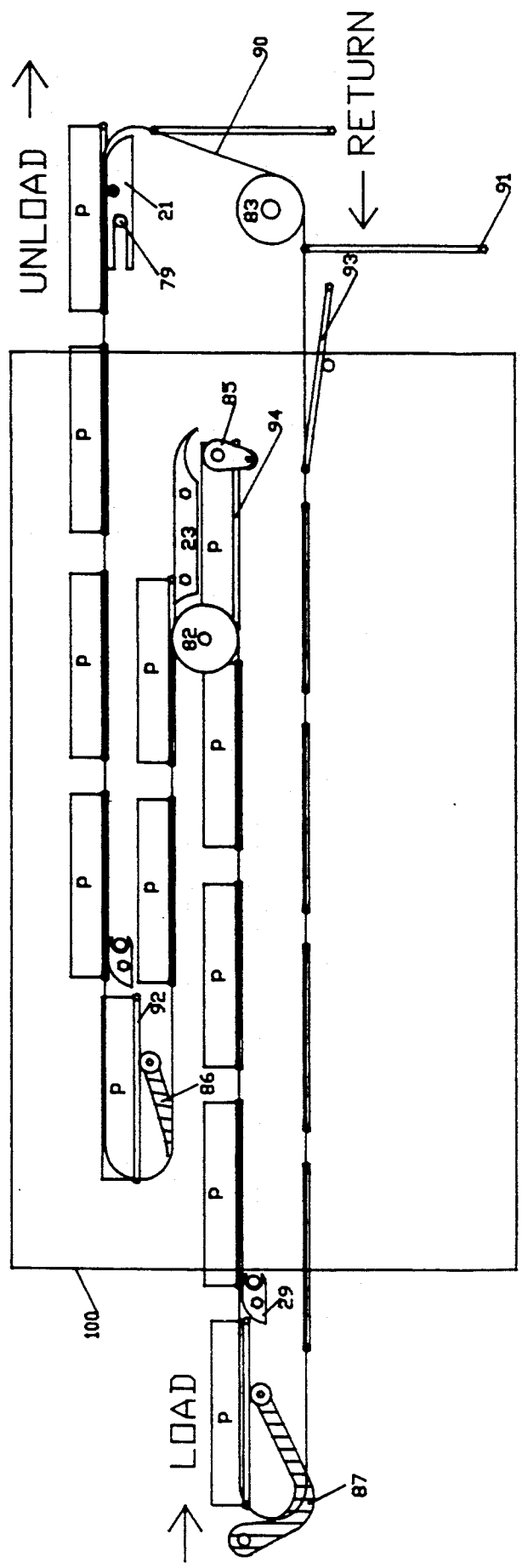
FIG. 10 is a flow chart of one embodiment of the timed retention conveying apparatus in operation, with some parts left in for orientation purposes.

Description—FIG. 10

Referring to FIG. 10, elevation view and flow chart, an embodiment of the invention showing input or loading area, area of desired environment, output or unloading area and tray return.

Operation—FIG. 10

In this embodiment, product flow is left to right, starting at the input end where product P is first placed on a tray and flowing up through the environmental enclosure until the processed product P emerges from the environmental enclosure at the output end where the processed product P is removed and the trays are allowed to drop for cleaning, such as may be necessary with food products as when baking bread or freezing fish. The trays are then lowered to the return level where they are led by fixed guides back to a horizontal attitude for return to the input end.

An additional embodiment of the invention would be to reverse the above process, utilizing the output as the input with the product flow from right to left, down through the environmental enclosure to emerge at the end presently used for input.

Accordingly, the reader will see that the timed retention conveying apparatus of this invention can be used to move items through a controlled environment as part of a continuous process without dropping, spilling or disturbing the items, once they are placed on their respective trays, until they leave the environmental enclosure. Furthermore, the timed retention conveying apparatus has the additional advantages that

- allows the trays to be lifted upward through many levels;
- allows retention times of less than one hour to several hours within the environmental enclosure;
- it provides a tray conveyor system which is reversible and able to be loaded from either end;
- it provides a system of lifting devices that will operate in refrigerated or heated environments;

it provides a system of lifting devices which will continue to operate even if the drive chain becomes worn or stretched;

it provides a drive mechanism for each level, above the original drive level, to be driven by its own set of bevel gears thereby avoiding excessive force being placed on one point of a chain traversing six or more levels which could stretch or deform the chain.

While the above description contains many specificities, these should not be construed as limitations to the scope of the invention, but rather as an amplification of one preferred embodiment thereof. Many other variations are possible, for example:

1. The above description and figures, for reasons of simplicity, illustrate only four levels, 3 traverses through the environmental enclosure with the lowest level for tray return. A likely variation would include several additional levels, limited only by the height of the environmental enclosure.
2. The above description, assumes the flow will be from left to right, but because of the reversibility of this system, at least three configurations for this invention could be utilized:
   A. As shown in drawings.
   B. With present input used as out put and flow reversed.
   C. With input and output at the same end and flow in either direction.
3. The above description assumes the trays are to be fabricated from individual pieces but when used in a refrigerated environment, such as a food freezing process, a one piece tray molded from a high density plastic might be better to avoid product freezing and sticking to tray surfaces and to facilitate tray cleaning.

We claim:

1. A timed retention conveying apparatus having a plurality of rigid surfaces in an endless belt configuration, with a connected supporting framework, capable of traversing a plurality of levels with the improvement characterized in that, the horizontal orientation of said rigid surfaces is maintained for transporting indexed items on said rigid surfaces, the items original indexing is maintained until the items reach an unloading point and said unloading point is invertible with the loading point, the apparatus comprising:

(a) a means of coupling rotational energy from a motor to the conveying apparatus at more than one point to maintain timing and consistency of energy transmission,
   (b) a means of maintaining the horizontal orientation of said rigid surfaces by,
   (c) a means of hinging said rigid surfaces so said rigid surfaces then have a hinged end and a free end and by,
   (d) a rotational energy connecting means for changing a horizontal movement of the rigid surface to a vertical movement of said rigid surface at a first location independent of travel direction and by,
   (e) a reciprocating means for changing the horizontal movement of said rigid surface to a vertical movement of said rigid surface at a second location independent of travel direction.

2. The apparatus of claim 1 wherein the rotational energy coupling means comprises a cross apparatus shaft, communicating with a variable speed motor and speed reducer, which communicates with a vertical shaft on each side of the apparatus and the vertical shafts extended to communicate with and drive said endless belt at said plurality of levels.

3. The apparatus of claim 1 wherein the rotational energy connecting means comprises a drive gear locked to a chain driven sprocket and rotatively communicates through two idle gears to a driven gear locked to a rotating lifting arm which rotates in the opposite direction of said chain driven sprocket, (a) said rotating lifting arm communicates with the free end of said rigid surface to raise and maintain horizontal orientation of said rigid surface.

4. The apparatus of claim 1 wherein said reciprocating means comprises a cam locked to a sprocket which translates the linear movement of a chain to the rotational movement of said cam which communicates with a cam follower locked to a lifting arm, (a) said lifting arm communicates with the free end of said rigid surface to raise and maintain horizontal orientation of said rigid surface.

5. The apparatus of claim 1 wherein said rotational energy connecting means comprises a gear locked to a sprocket which translates the linear movement of a chain to the rotational movement of said gear communicating through idler gears with a rotating lifting arm, (a) said lifting arm communicates with the free end of said rigid surface to raise and maintain horizontal orientation of said rigid surfaces.

* * * * *